(12) United States Patent
Boulineau et al.

(10) Patent No.: US 7,377,639 B2
(45) Date of Patent: *May 27, 2008

(54) LAMINATED FUNCTIONAL WAFER FOR PLASTIC OPTICAL ELEMENTS

(75) Inventors: Michael S. Boulineau, Forest Lake, MN (US); Eric J. Woelfle, Princeton, MN (US); Xuzhi Qin, Hacienda Heights, CA (US); Hideyo Sugimura, Northoaks, MN (US); Derek Harris, Woodbury, MN (US)

(73) Assignee: Insight Equity A.P. X, LP, Ramsey, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/398,814

(22) Filed: Apr. 5, 2006

(65) Prior Publication Data

US 2006/0187411 A1  Aug. 24, 2006

Related U.S. Application Data

(63) Continuation of application No. 10/680,658, filed on Oct. 6, 2003, now Pat. No. 7,036,932.

(60) Provisional application No. 60/416,224, filed on Oct. 4, 2002.

(51) Int. Cl.
*G02C 7/02* (2006.01)

(52) U.S. Cl. .................. 351/177; 351/163; 351/166; 351/172

(58) Field of Classification Search ............... 351/163, 351/177

See application file for complete search history.

(56) References Cited

U.S. PATENT DOCUMENTS

| | | | | |
|---|---|---|---|---|
| 6,138,286 | A * | 10/2000 | Robrahn et al. | 2/436 |
| 6,145,984 | A * | 11/2000 | Farwig | 351/49 |
| 6,328,446 | B1 * | 12/2001 | Bhalakia et al. | 351/163 |
| 6,971,116 | B2 * | 11/2005 | Takeda et al. | 720/718 |
| 7,021,761 | B2 * | 4/2006 | Kunzler et al. | 351/162 |
| 7,025,458 | B2 * | 4/2006 | Vu | 351/177 |
| 7,036,932 | B2 * | 5/2006 | Boulineau et al. | 351/163 |
| 7,077,985 | B2 * | 7/2006 | Maki et al. | 264/1.7 |
| 7,104,648 | B2 * | 9/2006 | Dahi et al. | 351/177 |

* cited by examiner

*Primary Examiner*—Jessica T Stultz
(74) *Attorney, Agent, or Firm*—Inskeep IP Group, Inc.

(57) ABSTRACT

A functional wafer of the present invention is disclosed to solve manufacturing difficulties involved in the production of optical elements such as polycarbonate ophthalmic lenses. The functional wafer may include a front layer, a functional layer, and a back layer, whereas the front layer and the back layer are bonded to the functional layer with or without additional adhesive. Said functional layer is smaller than at least the front layer by about 0.5 mm to 5 mm along the perimeter edge. A functional wafer of this construction can be conveniently and effectively incorporated into a lens through an insert injection molding process, in which said back layer will be in contact with the lens material.

4 Claims, 2 Drawing Sheets

Figure 1.

"Prior Art"

LAMINATED FUNCTIONAL WAFER FOR PLASTIC OPTICAL ELEMENTS

CROSS REFERENCE TO RELATED APPLICATIONS

The present invention is a continuation of U.S. patent application Ser. No. 10/680,658 filed Oct. 6, 2003, now U.S. Pat. No. 7,036,932 which claims benefit of U.S. Provisional Application Ser. No. 60/416,224, filed Oct. 4, 2002, both of which are incorporated herein by reference.

BACKGROUND OF THE INVENTION

1. Field of the Invention

The present invention generally relates to laminated wafers and to methods of making laminated wafers. The invention particularly relates to laminated wafers that provide added functions to optical elements. The invention more particularly relates to laminated functional wafers which are incorporated into optical elements using insert injection molding and to methods of making such laminated functional wafers.

2. Description of the Related Art

Plastic ophthalmic lenses made from materials such as polycarbonate and CR-39, have become popular due to their low cost and light weight over glass lenses. Polycarbonate lenses have superior impact resistance compared to CR-39 lenses, and are preferred for applications that require additional safety features. The use of polycarbonate lenses, has particularly become widespread in the United States. Consequently, the demand for sport goggles and sunglasses which are impact resistant has increased.

Typically, functional properties other than optical power are incorporated into polycarbonate lenses. For example, lenses with light polarization function are used to effectively cut glare from road and water surfaces. Photochromic properties may also be incorporated into a plastic lens, as well as color enhancement, color selection, mirror, tint, decoration, and indicia, to name a few.

U.S. Pat. Nos. 5,751,481 and 5,805,336 discloses techniques for incorporating light polarization function into a plastic lens. In this process, a polarized laminate is formed by adhering a polarizing film between two transparent polymeric sheets. The polarizing film is typically a stretched PVA film with absorbed iodine. The laminate is compression-formed under heat into a pre-curved lens blank. The transparent polymeric sheet on the concave side is substantially thicker than the polymeric sheet on the convex side. The polymeric sheet on the concave side is thick enough to allow the polarized lens blank to be surfaced into an ophthalmic polarized lens.

A more efficient and effective method to incorporate light polarization function into a lens manufactured from a thermoplastic material such as polycarbonate is insert injection molding. For example, U.S. Pat. No. 6,328,446 and 5,856,860, herein incorporated by reference, describes an insert injection molding method to manufacture polarized polycarbonate lenses. In this process, a polarizing plate wafer is first placed inside a mold cavity. Polycarbonate lens material is then injected into the cavity and fused to the back of the polarizing plate. The polarizing plate is a laminate consisting of a polarizing film with two protective transparent resin sheets bonded to each side of the polarizing film. The finished product is an injection molded, polarized polycarbonate lens.

Photochromic plastic lenses have been the subject of considerable attention due to the weight advantage and impact resistance they offer over glass lenses. Currently, several existing methods exists to incorporate photochromic properties into plastic lenses.

One method involves applying a coating to the lens surface containing dissolved photochromic compounds. For example, Japanese Patent Application 3-269507 discloses the process of applying a thermoset polyurethane coating containing photochromic compounds to the surface of a lens. U.S. Pat. No. 6,150,430 discloses a similar photochromic polyurethane coating applied to the surface of a lenses.

Another method involves coating a lens with a base coating, then imbibing a solution containing photochromic compounds into the base coating material. The most commonly used base material is polyurethane.

However, the two methods described above have significant shortcomings, especially when the photochromic lens has segmented power portions, e.g., a flat-top bifocal lens. Typically a coating of about 25 μm or more is needed to incorporate a sufficient quantity of photochromic compounds into the-base in order to provide the desired light blocking quality when the compounds are activated. This relatively thick coating is not suited for application on the surface of a segmented, multi-focal lens. An unacceptable segment line and coating thickness nonuniformity around the segment line are just a few of the major drawbacks of the technique.

Similar to polarized polycarbonate lenses, photochromic polycarbonate lenses can also be effectively produced with an insert injection molding method as disclosed in U.S. Pat. No. 6,328,446. In this process, a unitary photochromic laminate is first placed inside a mold cavity. Polycarbonate lens material is then injected into the cavity and fused to the back of the photochromic laminate, producing a photochromic polycarbonate lens. Because a thin photochromic layer in the laminate provides the photochromic functionality, a lens with any surface curvature is practical using the insert injection molding method.

Transparent resin laminates with light polarization function and transparent resin laminates with photochromic function have been disclosed in many patents and publications. For example, U.S. Pat. Nos. 4,427,741, 4,592,623, 4,774,141, 4,803,014, 5,051,309 and 6,055,096, incorporated herein by reference. Example photochromic laminates are disclosed in U.S. Pat. No. 4,889,413, U.S. Patent Publication No. 2002/01 97484, and WO 02/093235, all of which are incorporated by reference. Other photochromic laminates are disclosed in Japanese Patent Applications 61-276882, 63-178193, 4-358145, and 9-001 71 6.

Figure 1:
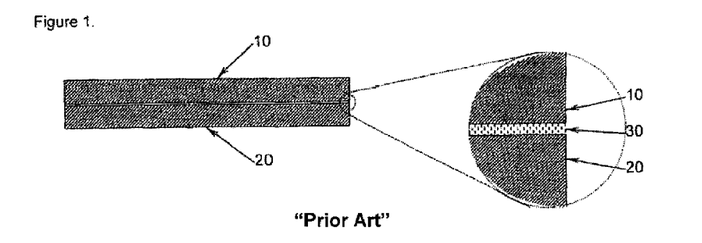
FIG. 1 is a cross sectional view of a conventional functional wafer showing the three layers of equal size.

The most commonly used structure for either a polarizing plate or a photochromic laminate is a functional layer bonded between two transparent resin sheets. The functional layer is often a polarizing film or a photochromic film. In this process, wafers (i.e., unitary laminates or plate) are cut from a large laminate or plate. The wafers serve as inserts in the insert injection molding process. FIG. 1 shows the cross section of a conventional wafer comprising a front transparent resin sheet 10, a back transparent resin sheet 20, and a functional layer 30. There may also exist adhesive layers (not shown) between the functional layer 30 and the transparent resin sheets 10 and 20.

One of the problems associated with conventional wafers in the manufacture of polarized or photochromic lenses by insert injection molding is the bleeding of the adhesive material and/or the functional layer material. By the term "bleeding" it is meant that the materials between the transparent resin sheets runs out of the cover of the resin sheets in the lateral direction. Often bleeding occurs from the deformation of the photochromic layer under the high temperature and pressure used during the molding process. In particular, bleeding occurs when the host material for the photochromic compounds melts and escapes from its position between the two transparent resin sheets of the laminate during the injection molding process.

The inventors have discovered that bleeding most frequently results from an excess amount of adhesive or host material and from using a material that is relatively too soft. Material bleeding will result in tooling contamination and increase the surface defect level of the molded lenses. Even more seriously, the bleedings can contaminate the coating solution which is often applied in a hard-coating application after the lens has been molded. This increases the coating defect level of the coated lenses.

Therefore, the need exists to overcome the bleeding problem associated with existing laminate wafers and methods of making these wafers. In particular, a need exists to reproducibly manufacture functional, lenses using the insert injection molding process that produces a lens without host material or adhesive bleeding.

BRIEF SUMMARY OF THE INVENTION

The present invention illustrates an improved laminate wafer for adding functional properties to plastic lenses. The wafer is especially useful for effectively and efficiently manufacturing plastic lenses through an insert injection molding process. The laminate wafer comprises at least one functional layer and at least one transparent resin sheet. The functional layer is smaller in size (e.g. smaller in the lateral direction) than at least one of the transparent resin sheets. The size difference from the perimeter edge of the wafer depends on the thickness and material properties of the functional layer. For a typical 75 mm to 80 mm diameter wafer, this size difference may be from about 0.5 mm to 5 mm.

It is an object of the present invention to provide an improved functional laminate wafer that can be used to produce plastic lenses from insert injection molding.

It is another object of the present invention to provide a functional laminate wafer that resists the high temperatures and pressures associated with the injection molding process.

It is a further object of the present invention to provide a functional laminate wafer that is resistant to bleeding and thus to manufacture injection molded plastic lenses more efficiently.

These and other objects are achieved by the transparent functional laminate wafer in accordance with the present invention.

The functional wafer of the present invention comprises at least one functional layer and at least one transparent resin sheet. The functional layer and the transparent resin sheet are bonded together with or without adhesive. If a functional layer provides light polarization property, it is composed of a stretched polymeric host film and a polarizing element. Preferred polymeric host film is polyvinyl alcohol, and preferred polarizing element is a dichroic dye.

Photochromic functional layers are composed of a polymeric host film and a photochromic compound. The photochromic host material is preferably polyurethane, either thermoplastic or thermoset, although any transparent resin material that provides sufficient photochromic performance may be used. If two transparent resin sheets are utilized in the laminate functional wafer, the functional layers are sandwiched between the front and the back resin sheets. If one transparent resin sheet is used in the laminate wafer, it is utilized in the front of the lens.

The front and back transparent resin sheets are preferably made of the same material as the lens base. That is, if the lens base material is polycarbonate, it is preferred to have polycarbonate resin sheets bonded to the functional layer. The term "front resin sheet" refers to the resin sheet facing the mold cavity, which will duplicate the front (convex) surface of the molded plastic lens. The term "back" refers to the resin sheet that is facing the lens base. The term "lens base" describes the portion of the lens which is molded onto the laminate to form the main portion of the lens.

The objects of the present invention are further achieved by the following preferable technical aspects: (i) a functional laminate wafer of 50 mm to 80 mm in diameter, (ii) a functional layer smaller than at least the front transparent resin layer by about 0.5 mm to 5 mm from the perimeter edge, (iii) a thickness of the functional layer of from about 5 μm to about 80 μm.

The functional wafer of the present invention can be directly used in the insert injection molding process. For lenses having a high diopter front (convex) surface, it is preferred to pre-form the wafers into spherically curved shapes with a proper diopter.

The embodiments of the present invention not only apply to lenses made from polycarbonate but also other thermoplastic materials that have not yet been adapted to the ophthalmic lens industry.

The terms "film" and "thin layer" are used interchangeably. The terms "layer" and "sheet" are also used interchangeably. Additionally, the terms "wafer", "insert", "unitary laminate", and "unitary plate" are used interchangeably.

DETAILED DESCRIPTION OF THE INVENTION

One embodiment of the present invention comprises a front transparent resin sheet, a back transparent resin sheet, and at least one functional layer bonded or fused between the front and back transparent resin sheets. There may or may not exist additional adhesive layers between the functional layers and the transparent resin sheets.

An example of such a functional laminate with one functional layer is a polarizing plate comprising a polyvinyl alcohol (PVA) based dichroic dye type polarizing film bonded between two cellulose acetate butyrate (CAB) resin sheets by a PVA adhesive.

Another example using one functional layer is a photochromic laminate comprising a polyurethane based photochromic host layer bonded between two polycarbonate resin sheets. Adhesive is not usually required with such materials.

A two functional layer example uses a photochromic polarizing plate comprising a PVA based polarizing film, a polyurethane based photochromic film, and two polycarbonate resin sheets. One side of the polarizing film is bonded to the back resin sheet by a urethane adhesive, the other side of the polarizing film is bonded to the photochromic film, which in turn is bonded to the front resin sheet without additional adhesive.

The back transparent resin sheet is preferably thermally fusible with the lens base material, allowing the laminate to be thermally integrated with the lens base. Preferably, both front and back transparent resin sheets are made of the same material as the lens base. That is, if the lens base material is polycarbonate, it is preferred to have polycarbonate resin sheets bonded to the functional layer. Similarly, if the lens base material is CAB, it is preferred to have CAB resin sheets bonded to the functional layer.

Another embodiment of the present invention comprises only one transparent resin sheet and at least one functional layer. The transparent resin sheet can be either the front layer or the back layer. When the transparent resin sheet is the back layer and a functional layer acts as the front layer, the host material for the functional layer is preferably the same as the lens base material.

For example, a photochromic laminate comprising a front polycarbonate resin sheet and a thermoplastic polyurethane layer with photochromic compounds incorporated therein. When a wafer cut from this photochromic laminate is used to make a photochromic lens through an insert injection molding process, the photochromic polyurethane layer also acts as an adhesive layer.

An example embodiment with two functional layers has a polarizing plate comprising a CAB front resin sheet, a PVA based iodine-type polarizing film bonded to the CAB sheet with a PVA adhesive, and a dyed polycarbonate layer with desired tint to complement the color of the polarizing film to a neutral gray.

Yet another example embodiment with two functional layers has a hard-coated polarizing plate comprising a hard-coated polycarbonate sheet providing abrasion resistance property as the front layer, a PVA based polarizing film, and a polycarbonate resin sheet as the back layer.

Yet another embodiment of the present invention comprises no transparent resin sheet and at least two functional layers. One functional layer acts as the front layer and another functional layer acts as the back layer. Again, the host material for the front functional layer is preferably the same as the lens base material, or the front functional layer can protect itself from damage. The host material for the back functional layer is also preferably the same material as the lens base. The back functional layer can also act as an adhesive layer, in this respect.

In yet another embodiment of the present invention, a functional laminate with only two functional layers comprises a polarizing plate having a polycarbonate sheet tinted with a melanin dye as the front layer, and a polarizing film based on poly(ethylene tetraphthalate) and dichroic dyes as the back layer. Wafers cut from such a polarizing plate may be used to incorporate highly moisture-resistant polarizing film into polycarbonate lenses.

When the functional layer provides light polarization property, the host polymeric film is preferably composed of PVA, as described in U.S. Pat. No. 5,051,039, which is hereby incorporated by reference. Specific examples of a few possible suitable resins include PVA, polyvinyl formal, polyvinyl acetal, and saponified (ethylene/vinyl acetate) copolymer.

Iodine or organic dichroic dyes are two possible examples that may be use to impart the polarizing property to the host polymeric film, although organic dichroic dyes are preferred due to their stability over moisture and heat. Examples of a few possible dichroic substances (particularly dichroic dye) include Chlorantine Fast Red (C. I. 28160), Chrysophenine (C. I. 24895), Sirius Yellow (C. I. 29000), Benzopurpurine (C. I. 23500), Direct Fast Red (C. I. 23630), Brilliant Blue 6B (Q. I. 24410), Chlorazol Black BH (C. I. 22590), Direct Blue 2B (C. I. 22610), Direct Sky Blue (C. I. 24400), Diamine Green (C. I. 30295), Congo Red (C. I. 22120), and Acid Black (C. I. 20470).

Preferably, PVA polarizing films containing dichroic dyes can be made by processes known to those skilled in the art. In one example process, a dyeing bath containing dichroic dyes and if necessary dyeing aids such as an inorganic salt, a surface active agent and the like is dripped into a PVA type film at a temperature of 30~60° C. to dye it. Then, if necessary, the PVA type film is subjected to metallic salts and boric acid treatment and dried. In order to afford polarizing function, the film is stretched uniaxially up to a length of 2 or more times of its original length, particularly preferably to a length of 2.5-4 times before dyeing, after dyeing or during dyeing. Stretching may be conducted under dry conditions (generally in a range of ambient temperature to 180° C.) or wet conditions. When stretching is carried out during dyeing, the film is stretched in a dyeing bath at 30~60° C.

Other polarzing films include a polarizing film based on polyene, a polarizing film based a hydrophobic polymer doped with water insoluble dichroic dyes, and a polarizing film based on a liquid crystalline polymer doped with dichroic dyes.

The photochromic layer is composed of a host resin material having dissolved, dispersed or suspended photochromic compounds. In selecting the host resin material, more consideration is given to the photochromic performance, such as the fading rate, color intensity, and fatigue behavior. The host resin material will be pervious to that portion of the electromagnetic spectrum that activates the photochromic compounds. The host material will have enough free volume to accommodate the molecules of the photochromic compounds, and preferably a glass transition temperature lower than 0° C. The host color should not be such that it masks the color of the activated form of the photochromic compounds, i.e., so the change in color is readily apparent to the observer.

Examples of host resin materials which may be used with the photochromic compounds include: polymers (homopolymers and copolymers) of the bis(allyl carbonate) monomers, diethylene glycol dimethacrylate monomers diisopropenyl benzene monomers, ethoxylated bisphenol A dimethacrylate monomers, ethylene glycol bismethacrylate monomers, poly(ethylene glycol) bismethacrylate monomers, ethoxylated phenol bismethacrylate monomers, alkoxylated polyhydric alcohol acrylate monomers, such as ethoxylated trimethylol propane triacrylate monomers, urethane acrylate monomers, and vinylbenzene monomers, and styrene; polymers (homopolymers and copolymers) of mono- or polyfunctional, e.g., di- or multi-functional, acrylate and/or methacrylate monomers, poly(C1-C12 alkyl methacrylates), such as poly(methyl methacrylate), poly(oxyalkylene)dimethacrylate, poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), polyanhydrides, polyurethanes, polythiourethanes, polycarbonates, polyesters, poly(ethylene terephthalate), polystyrene, poly(alpha methylstyrene), copoly(styrene-methyl methacrylate), copoly(styrene-acrylonitrile), polyvinylbutyral and polymers, i.e., homopolymers and copolymers, of diallylidene pentaerythritol, particularly copolymers with polyol (allyl carbonate) monomers, e.g., diethylene glycol bis(allyl carbonate), and acrylate monomers, e.g., ethyl acrylate, butyl acrylate. Blends of compatible transparent polymers are also suitable as host materials.

Preferred host resin materials for photochromic compounds are polyurethanes, poly(urea-urethane)s, polyanhydrides, and aminoplast resins. Example polyurethanes include those made from condensation reactions between multi-functional isocyanate compounds and polyols such as polyester polyols and polyether polyols, and those made from special functional polyurethanes such as acrylic polyurethanes and epoxy polyurethanes. Poly(urea-urethane)s include those made from condensation reactions between multi-functional isocyanate compounds and polyols and multi-functional amines. Polyanhydrides include those made from condensation reactions between multi-functional anhydride compounds and polyols and/or multi-functional amines.

More preferred host resin materials are polyurethanes made from non-yellowing diisocyanate compounds and polyester polyols such as polycaprolactone polyol. The polyurethane material may be thermoplastic or thermoset, although the later is even more preferred from the heat resistance point of view when the photochromic wafer is incorporated into a lens through insert injection molding.

There are many methods available for ones skilled in the art to incorporate photochromic compounds into a host resin material. Such methods include hot-mixing (kneading), solution-casting, coating, and impregnating (diffusing), etc. Among them, hot-mixing is less preferred due to possible thermal degradation to the photochromic compounds.

Also incorporated in the photochromic host resin material are special additives such as antioxidants, light stabilizers, and UV absorbers. All of these additives are added in to enhance the fatigue resistance of the photochromic compounds. Hindered amines are usually used as light stabilizers, and hindered phenols are usually used as antioxidants. Preferred hindered amine light stabilizers include, bis(1,2,2,6,6-pentamethyl-4-piperidinyl)-sebacate, or a condensation product of 1,2,2,6,6-pentamethyl-4-piperidinol, tridodecyl alcohol and 1,2,3,4-butanetetra caboxylic acid as tertiary hindered amine compounds. Preferred phenol antioxidants include, 1,1,3-tris(2-methyl-4-hydorxy-5-t-butylphenyl)butane, tetrakis-[methylene-3-(3',5'-di-t-butyl-4'-hydroxy-phenyl)propionate]methane, and 1,3,5-tris(3,5-di-t-butyl-4-hyroxybenzyl)-1,-3,5-triazine-2,4,6-(1H,3H,5H)-trione.
Phenol antioxidants that contain 3 or more hindered phenols are preferable.

Suitable photochromic compounds in the context of the invention are organic compounds that, in solution state, are activated (darken) when exposed to a certain light energy (e.g., outdoor sunlight), and bleach to clear when the light energy is removed. They are selected from the group consisting essentially of benzopyrans, naphthopyrans, spirobenzopyrans, spironaphthopyrans, spirobenzoxzines, spironaphthoxazines, fulgides and fulgimides.

Among the photochromic compounds identified, naphthopyran derivatives are preferred for optical elements such as eyewear lenses. They exhibit good quantum efficiency for coloring, a good sensitivity and saturated optical density, an acceptable bleach or fade rate, and most importantly good fatigue resistance. These compounds are available to cover the visible light spectrum from 400 nm to 700 nm. Thus, it is possible to obtain a desired blended color, such as neutral gray or brown, by mixing two or more photochromic compounds having complementary colors under an activated state.

More preferred are naphtho[2,1b]pyrans and naphtho[1,2b]pyrans represented by the following generic formula:

naphth[2,1-b]pyran naphth[1,2-b]pyran

Substituents on various positions of the aromatic structure are used to tune the compounds to have desired color and fading rate, and improved fatigue behavior. Such photochromic compounds have been reported in numerous patents. Examples are U.S. Pat. Nos. 5,658,502, 5,702,645, 5,840,926, 6,096,246, 6,113,812, 6,296,785, and 6,608,215. They are all incorporated herein by reference.

The quantity of photochromic compound(s) incorporated into the host resin is determined by the desired light blockage in the activated state and the thickness of the photochromic layer itself. The preferred outdoor visible light transmission of sunglasses is preferably between 10% and 50%, more preferably between 10% and 30%, most preferably between 10% and 20%. Preferably, the amount of total photochromic substance incorporated into or applied on the polyurethane layer may range from about 0.05 wt. % to about 5 wt. % and more preferably from about 0.5 wt. % to about 3.0 wt. %. If the thickness of the photochromic layer is 100 μm, between about 0.5 wt. % to about 1 wt. % of photochromic compound(s) is needed to achieve an outdoor light transmission of between 10% and 20%. The amount of photochromic compound(s) needed is inversely proportional to the thickness of the photochromic layer. In other words, to achieve the same outdoor light transmission the thicker the photochromic layer, the lower the concentration of photochromic compound(s) needed. The concentration of the photochromic compound(s) also depends on the color intensity of the photochromic compound(s) at the activated state.

In selecting the material for the transparent resin sheets, optical quality and the formability remain important property considerations. The material should preferably be optically clear and not haze up under the molding conditions. The material should be formable under heat, pressure or vacuum into a geometrically stable shape, e.g., a spherically curved wafer with a certain diopter. The transparent resin sheets should substantially prevent the structure of the polarizing elements such as dichroic substance(s) or the photochromic compounds from being altered during the insert injection molding process, extending their lifetime.

Many thermoplastic resins are suitable to make the transparent resin sheet through either extrusion or solution casting. Suitable thermoplastics include polycarbonates, polyamides, polyesters, polystyrenes, polyacrylates, polysulfones, polyarylates, cellulose esters, polycycloolefins, and copolymers and/or blendings of thereof, such as copolymers of styrene/methacrylate, blendings of a polycarbonate and a polyester. Preferred resins are polycarbonates, cellulose acetate butyrate, polyacrylates, and copolymers of acrylate and styrene. A polycarbonate-based resin is particularly preferred because of high transparency, high tenacity, high thermal resistance, high refractive index, and most importantly, compatibility with the polycarbonate lens base material.

It is preferred that the back transparent resin sheet has the same or similar material composition as the lens base allowing both to be thermally fused together to provide the best incorporation of the functional wafer into the lens. It is more preferred that both the front and back transparent resin sheets are made of the same material as the lens base. That is, if the lens base material is polycarbonate, it is preferred to have polycarbonate resin sheets bonded to the photochromic layer. If the lens base material is cellulose acetate butyrate, for example, then it is preferred to have cellulose acetate butyrate resin sheets bonded to the photochromic layer. The term "front resin sheet" refers to the resin sheet is facing the mold cavity to duplicate the front (convex) surface of the whole lens. The term "back resin sheet" refers to the resin sheet is facing the lens base. The term "lens base" refers to the portion of the lens that is molded onto the laminate to form the main portion of the lens.

The transparent resin sheet may be bonded to the functional layer with or without additional adhesive, depending on the nature of the host material of the functional layer. For example, if a photochromic laminate wafer is formed with the in-situ polymerization of the host material, it is most likely an additional adhesive is not needed. Such host material can be the one selected from the group consisting of urethane polymers, acrylate urethane polymers, ureaurethane polymers, epoxy urethane polymers, epoxy polymers, anhydride polymers, and aminoplast polymers. If the functional layer is formed separately and then laminated with the transparent resin sheets, an addition adhesive may be needed to provide the necessary bonding. Examples of adhesives include those based on isocyanate, polyhurethane, polythiourthane, epoxy, vinayl acetate, and acrylate.

Figure 2:
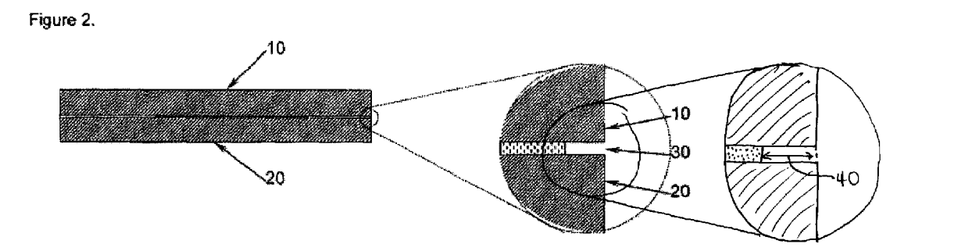
FIG. 2 is a cross sectional view of a functional laminate wafer in accordance with one embodiment of the present invention.
Figure 3:
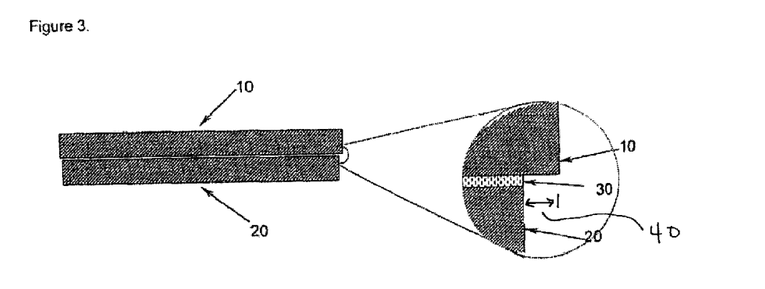
FIG. 3 is a cross sectional view of a functional laminate wafer in accordance with a preferred embodiment of the present invention.

FIGS. 2 and 3 illustrate example embodiments of the functional wafers in the present invention. FIG. 2 shows the cross sectional view of one embodiment in which the front layer 10 and back layer 20 have the same size, and the functional layer 30 is smaller than the front and back layers. The distance by which the functional layer 30 is smaller than the front layer 10 and the back layer 20 is evidenced by a gap 40. As noted, the front and back layers 10 and 20 may also be functional layers. If the front and back layers are of transparent resin sheets, the functional layer 30 may be a composite functional layer containing more than one individual functional layers bonded together.

In one preferred embodiment, the lateral size difference, or the size difference from the perimeter edge between the functional layer and the front and back layers, is from about 0.5 mm to 5 mm. A small size difference can be difficult to manufacture and ineffective in preventing functional host material bleeding. On the other hand, delamination may occur if the size difference is too large.

The optimum size difference is determined by the thickness and size of the functional layer and the mechanical properties of the host material under the molding conditions. For example, if a 50 micron layer of thermoset polyurethane is used as the photochromic layer, a size difference from the edge of about 1 mm to 2 mm is preferred for about a 70 mm to 80 mm wafer.

The size of the wafer is determined by the design of the mold cavity and the size of the lens to be molded. It is typically between about 50 mm and 100 mm.

The thickness of the functional layer depends on the nature of its function. For example, when the functional layer provides a photochromic function, preferably about 10 microns to 254 microns are used, and more preferably between 15 microns to 102 microns. When the functional layer provides light polarization, it is preferably between about 10 microns to 150 microns, more preferably between 30 microns to 102 microns.

While the thickness of a transparent resin sheet is not particularly restricted, it is typically about 2 mm or less, and preferably about 1 mm or less but not usually less than about 0.025 mm.

When incorporating the functional wafer into a plastic lens by insert injection method, the wafer may be used as flat. But it is more preferably formed into a spherically curved shape with a given diopter. The base curve diopter of the formed wafers is determined by the convex side curvature of the finished lenses. The forming process may be performed thermally with or without pressure or vacuum. It is convenient to utilize a platen having a forming surface that corresponds at least substantially or precisely to, the predetermined curvature of the convex side of the lens to be formed. This permits the convex side of the thermoformed lens blank to have substantially or precisely the refractive power desired in the finished lens and avoids the need to surface or grind the convex side of the lens blank. The temperature for forming will vary with the material of the transparent resin sheets. In general, the thermoforming temperature is close to but lower than the glass transition temperature of the resin material. For example, a suitable forming temperature for a photochromic laminate or a polarizing plate wafer with polycarbonate resin sheets will be from about 125° C. to 150° C. Often it will be beneficial to preheat the blank, for example, in the case of polycarbonate sheets, to a temperature from about 80° C. to 120° C. for about 5 to 20 minutes.

Figure 4:
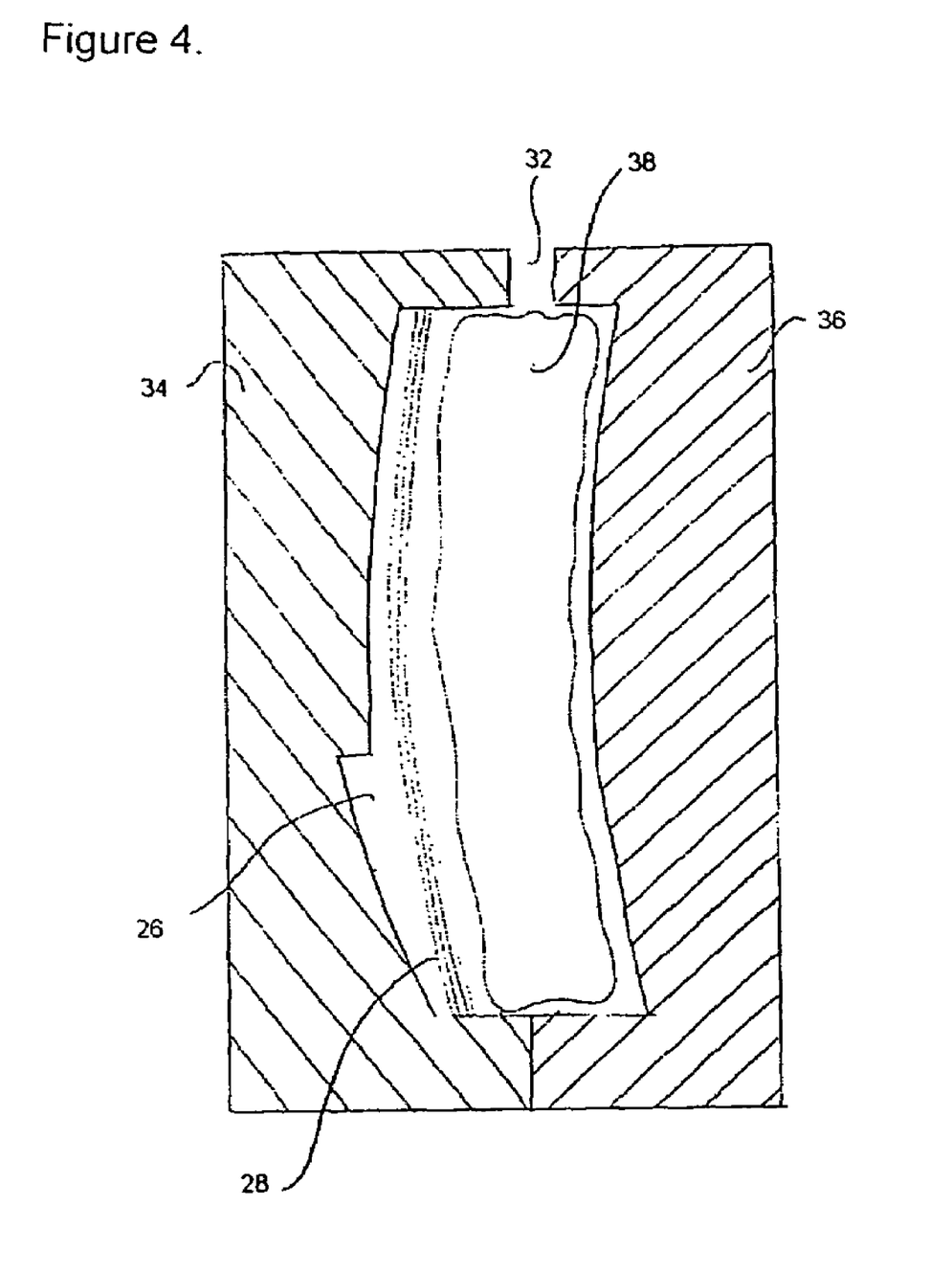
FIG. 4 is a cross sectional view illustrating the insert injection molding process of the utililizing the photochromic wafer of the present invention.

Referring to FIG. 4, to produce a plastic lens with a functional laminate wafer 28 of the present invention utilizing an insert injection molding process, a functional wafer 28 is placed in the molding lens cavity 26. The two mold halves 34 and 36 then close, and molten base lens resin material 38 is injected into the mold through the gate 32. The combined action of high temperature from the molten resin and high pressure from the injection screw confirm the wafer 28 to the surface of the mold cavity 26, and thermally fuse the lens material to the back resin sheet of the functional wafer 28. The result is a plastic lens with a specific property provided by the functional wafer integrated on the convex side of the lens. The lateral movement of the host material, if any, in the functional layer during the molding process is accommodated by the size difference between the functional layer and the front and back layers of the functional wafer. Thus, there will be no material bleeding out of the wafer.

FIG. 3 shows a more preferred embodiment of the present invention. The back layer 20 has the same size as the functional layer 30, and both are smaller than the front layer 10. This difference in size as between the front layer 10, and the back and functional layers 20 and 30, is evidenced by a gap 40. As noted, the front and back layer 10 and 20 may also be an independent functional layer. When the functional wafer is utilized to make a plastic lens, the injected molten plastic moves around the edges of the back layer 20 and the functional layer 30 to encapsulate them. Thus, no potential bleeding material will escape out to cause bleeding. The lens material that surrounds the edge of the functional layer applies a pressure against the host material or adhesive of the functional layer in the lateral direction to reduce the normal deformation of the layer due to the near incompressibility of the polymeric host material. Consequently, for a given mold clamping, the front transparent resin sheet is be pushed harder against the mold cavity to give better replication of the surface and segment line, if present.

There are several methods to manufacture the functional laminate wafer of the present invention. For example, the following method can be used to manufacture a functional wafer comprising one functional layer and two transparent resin sheets. First, functional layer pre-punches are formed, which have the desired lateral size and shape. The pre-punches are then laminated between two transparent resin sheets with or without adhesive. The final wafers, having two resin sheets of equal lateral size and smaller photochromic layer, are obtained by die-cut with a die size larger than the functional layer pre-punches.

Another method creates a functional laminate sheet with a conventional process, e.g., web lamination, then cut out the wafers from the laminate, and trim the edges of the wafers to give the lateral size difference between the functional layer and the transparent resin sheet layers. The last method is further described in the following, having a photochromic layer as the functional layer.

A photochromic laminate sheet having a photochromic layer may be produced through processes known to those skilled in the art. Depending on the nature of the host material processes such as casting-lamination (also referred to in the art as coating-lamination), and extrusion-lamination may be used. The photochromic layer utilizing a thermoplastic resin can be obtained by either casting or extrusion. To cast the photochromic layer, selected thermoplastic resin, photochromic compounds, and other necessary additives are first dissolved in a suitable solvent or in a mix of solvents to produce a solution with a solid percent in the range of from about15% to 45%. The solution is then cast on a release liner, dried, and transferred to one surface of either one of the back and front transparent resin sheets through lamination with or without additional adhesive. The other resin sheet is laminated next. For host materials such as thermoplastic polyurethane, hot-lamination at a temperature close to the softening point should provide sufficient adhesion so that no additional adhesive is needed.

Suitable solvents for thermoplastic polyurethane include toluene, ethyl acetate, methyl ethyl ketone, diethyl ketone, cyclohexyl ketone, tetrahydrofuran.

The photochromic solution may be cast with methods known to those skilled in the art, including slot die, knife-over-roll, reverse-roll, gravure, etc. If the solvent selected to dissolve the polyurethane does not whiten the resin sheet, a direct cast on the resin sheet may be employed. It is desirable to keep solvent retention in the cast photochromic layer and the resin sheet layers at a minimum level. The solvent retention should preferably be less than about 2 wt. %, and preferably less than about 1 wt. %. Conventional methods such as hot air dryers may be used to evaporate the solvent before lamination.

In an alternative process, the photochromic layer having a thermoplastic host resin may be extruded and laminated between the two transparent resin sheets. The photochromic compounds and other additives may be incorporated into the polyurethane during the resin synthesis stage or melt-mixed prior to extrusion.

If a thermoset resin such as thermoset polyurethane is used as the host material for the photochromic compounds, a cast-lamination process is preferred. A thermoset resin can be one-component or two-components. First, the starting materials-are premixed together. If the viscosity of the mix is too high to cast, or the photochromic compounds and other additives are hard to dissolve in the liquid resin components, it is desirable to use proper amount of solvent. The photochromic layer is then cast and laminated as in the case of thermoplastic resin host material. The curing of the thermoset resin usually starts after casting. Post curing after lamination is needed to archive optimum mechanical properties of the host material. For example, a photochromic laminate made from a thermoset polyurethane resin is post cured from about 60° C. to about 140° C. for about 2 hours to 1 week.

The thickness variation of the photochromic layer should be controlled in order to produce a uniform light blockage at the activated state. A thickness variation of less than 20% over the width of the laminate is required and preferably less than 15% and more preferably less than 10%.

Example processes for creating polarizing plates can be found in U.S. Pat. Nos. 4,427,741, 4,592,623, 4,774,141, 4,803,014, which are incorporated herein by reference.

Once a functional laminate sheet is made, the wafers, having defined size and shape according to the injection mold cavity, are cut out from the sheet. The cut can be made in a number of ways, including by a rolling knife cutter, a reciprocal stamping cutter, a straight-edge cutting knife moved translationally along a cut-line, a rotary or swing die traversed along a line or by a laser cutter.

The wafers having structure shown in FIG. 3 are finally formed by trimming the edge mechanically. A dry-cut edger with high-speed rotary blade and precision x-y position control such as Horizon II bevel edger from National Optronics (Charlottesville, Va.) can be used for this purpose.

Although the forgoing specification has focused on primarily polarizing wafers and photochromic wafers, the present invention is also applicable to other functional wafers that provide properties such as special color, color enhancement, special color management, mirror, infrared filter or reflector, melanin, anti-reflection, anti-fog, and hard-coating.

The embodiments of the present invention not only apply to lenses made from polycarbonate but also other thermoplastic materials which have not yet been commonly adapted to the ophthalmic lens industry.

The functional wafers and lenses incorporating them in accordance with the present invention will now be illustrated with reference to the following examples, which are not to be construed as a limitation upon the scope of the invention in any way.

In the following examples, all values are expressions of weight %. Uvinul® 3040, available from BASF (Mount Olive, N.J., US) and Tinuvins® available from CIBA (Tarrytown, N.Y., US) are UV absorbers and stabilizers.

EXAMPLE 1

A photochromic polyurethane laminate having two 0.3 mm thick polycarbonate sheets bonded to a 102 µm cross-linked polyurethane layer, which contains about 1.2% of a gray photochromic compound, was made by Mitsubishi Gas Chemicals (Tokyo, Japan). The laminate was cut into 76 mm diameter wafers, which in turn were spherically formed into 5.7 diopter wafers. The back (concave side) polycarbonate sheet and the photochromic layer were trimmed off from the edge by 2 mm with a Horizon II bevel edger (National Optronics, Charlottesville, Va.) equipped with a rotary carbide steel blade. The resulted wafers were used to make a semi-finished 6-base flat top bi-focal lenses. The front (convex side) polycarbonate sheet faces the concave mold cavity. After the insert injection molding process with common molding parameters, the finished lens has an acceptable segment line. No polyurethane bleeding from the wafer is observed. The mold cavity and surrounding are free of material leftover, and no cleaning is needed.

EXAMPLE 2

A 20% polyurethane solution in tetrahydrofuran was obtained from a thermoplastic polyurethane CLC-93A (Thermedics Polymers, Boston, Mass.). To the solution were also dissolved 3.0% of a gray photochromic dye, 2.0% of Tinuvin® 144, and 2.0% of Tinuvin® 765. The solution was cast with a doctor blade on a silicone coated polyester release liner. The cast film was dried at 60° C. for 10 minutes on a hot plate and then 100° C. for another 30 minutes in a hot air dryer.

A 380 µm thick sheet of polycarbonate from GE (New York, N.Y.) was laminated to the dried film on the liner at ambient temperature. The obtained laminate has a liner on the top, a polyurethane photochromic layer in the middle, and a polycarbonate sheet with masking on the bottom. Next, a 74 mm diameter cutting die was used to kiss-cut the laminate from the liner side on to the polycarbonate sheet to define the size of the photochromic layer. After the liner and un-needed polyurethane film were removed, another polycarbonate sheet was laminated on to the circular photochromic layer. The lamination was done on a hot-roll laminator at 130° C. to ensure good adhesion between the polycarbonate sheets and the polyurethane photochromic layer. Finally a 76 mm diameter die was used to cut the desired wafer off the laminate.

The photochromic wafer had a polyurethane layer of 25 µm thick, and its photochromic layer is 1 mm smaller than both polycarbonate sheets from the edge. It was used to make a 6-base semi finished flattop bi-focal lens without forming into a spherical shape. After the insert injection molding process with common molding parameters, the finished lens had an acceptable segment line. No polyurethane bleeding from the laminate was observed.

EXAMPLE 3

The procedure of Example 2 was followed, except the kiss-cut went through the first polycarbonate sheet and stopped at its masking film. The wafer so obtained had a polyurethane layer of 50 µm thick, and its back polycarbonate sheet and the photochromic layer were 1 mm smaller than the front polycarbonate sheet from the edge. It was used to make a 6-base semi finished flattop bi-focal lens without forming into a spherical shape. After the insert injection molding process with common molding parameters, the finished lens had an acceptable thin, sharp, crisp segment line. No polyurethane bleeding from the laminate was observed.

EXAMPLE 4

The procedure of Example 1 is generally followed, except that the photochromic laminate is replace by a polarizing plate comprising a PVA based dichroic dye polarizing film and two polycarbonate resin sheets bonded to each side of the PVA film by a urethane type adhesive. The polarizing film is 30 microns thick, and the polycarbonate sheet is 300 microns thick. Polarizing wafers with trimmed edges as in FIG. 3 are obtained from the polarizing plate. These wafers provide higher yield in manufacturing polycarbonate polarized lenses due to the elimination of bled adhesive and PVA material.

COMPARISON EXAMPLE 1

The same photochromic polyurethane wafers as in Example 1 were used to make flat top bi-focal lenses, without trimming the back resin sheet and the photochromic layer. After the insert injection molding process with the same injection molding process parameters, the finished lens has an unacceptable thick segment line. Polyurethane bleeding from the laminate is observed.

The foregoing detailed description of the preferred embodiments of the invention has been provided for the purposes of illustration and description. They are not intended to be exhaustive or to limit the invention to the precise embodiments disclosed. Many modifications and variations will be apparent to practitioners skilled in the art to which this invention pertains. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An optical element for use in a mold for an injection molded lens comprising:
   an outer first layer having a first size defined by a perimeter edge of the first layer;
   an inner second, functional layer having a second size defined by a perimeter edge of the second layer;
   said inner second, functional layer disposed adjacent to said outer first layer;
   wherein said second size is smaller than said first size by a difference; and
   wherein said difference provides room for said second layer to expand when molten lens material is introduced into said mold.

2. A method of making an optical element for use in a mold comprising:
   providing a first layer comprising a lamination side and a non-lamination side;
   providing a second layer substance, said second layer substance being functional; and,
   configuring said second layer functional substance against said lamination side of said first layer such that a size defined by a perimeter edge of said second layer functional substance is less than a size defined by a perimeter edge of said first layer; said perimeter edge of said second layer being unconstrained from expanding as a result of molten lens material being injected into said mold.

3. An optical element insertable into a mold for use in making an injection molded lens comprising:
   an outer first layer having a first size defined by a perimeter edge of the first layer;
   an inner second layer having a second size defined by a perimeter edge of the second layer;
   said inner second layer disposed adjacent said outer first layer;
   wherein said second size is smaller than said first size; and
   wherein said perimeter edge of said second layer is unconstrained from expanding as a result of molten lens material being injected into said mold.

4. A method of in-molding a wafer having outer layers having larger sizes than a functional layer to a lens comprising:

placing said a wafer in a mold, said wafer configured such that a gap exists between the mold and the perimeter edge of the functional layer;

injecting lens material into a cavity, defined by the mold, against the wafer;

whereby said gap allows the functional layer room to expand without bleeding.

* * * * *